United States Patent [19]

Westerman

[11] 4,089,542
[45] May 16, 1978

[54] COLLAPSIBLE VEHICLE

[76] Inventor: William J. Westerman, 2625 W. 4th St., Waterloo, Iowa 50701

[21] Appl. No.: 714,339

[22] Filed: Aug. 16, 1976

[51] Int. Cl.² .......................................... B62B 11/00
[52] U.S. Cl. .......................... 280/639; 180/25 A; 180/54 F; 280/43.17; 280/756
[58] Field of Search .................. 280/639, 43, 43.17, 280/43.19, 756; 180/25 A, 1 R, 54 F; 296/27

[56] References Cited

U.S. PATENT DOCUMENTS

| 3,580,348 | 5/1971 | Di Blasi | 280/639 |
| 3,589,745 | 6/1971 | Dougherty | 280/639 |
| 3,622,177 | 11/1971 | Notestine | 280/756 |

FOREIGN PATENT DOCUMENTS 1,003,609  2/1955  Germany ........................ 180/54 F Primary Examiner—Robert R. Song
Attorney, Agent, or Firm—Duckworth, Hobby, Allen & Pettis

[57] ABSTRACT

A foldable vehicle is adapted to be transported in its own container on the back of a motor home, yacht, or the like, for storage or shipping. The vehicle is motorized and has a chassis and a plurality of wheels along with passenger seats. The vehicle has means for raising and lowering the wheels relative to the chassis between an operative position and a collapsed position. In addition, the hood, window frame, steering wheel column, steering wheel, seats, and roll bar fold to provide a compact, folded vehicle for a shipping or storage container.

20 Claims, 11 Drawing Figures

U.S.Patent    May 16, 1978    Sheet 1 of 4    4,089,542

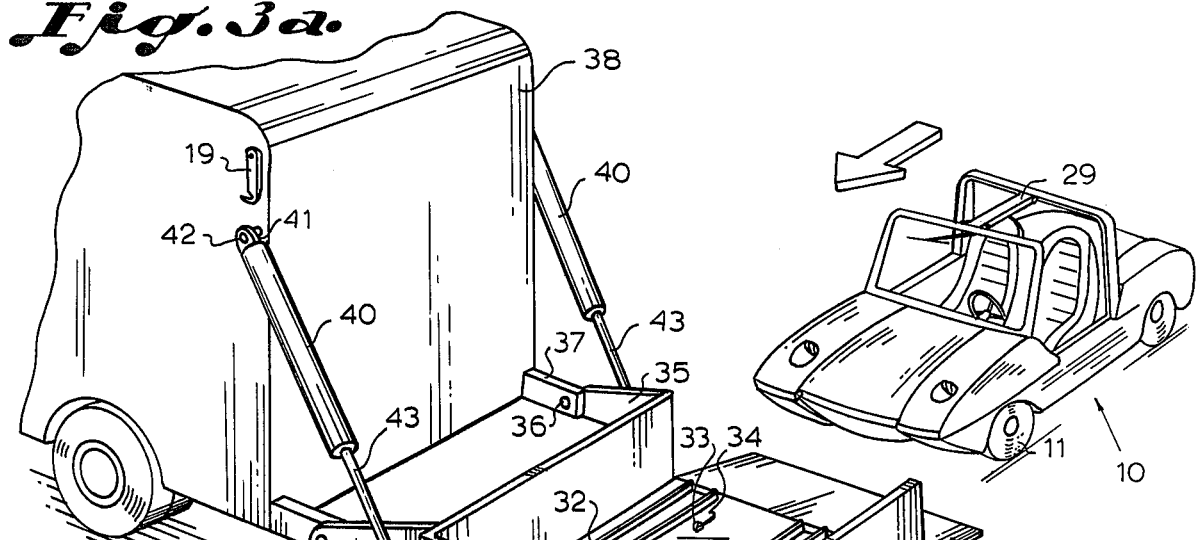
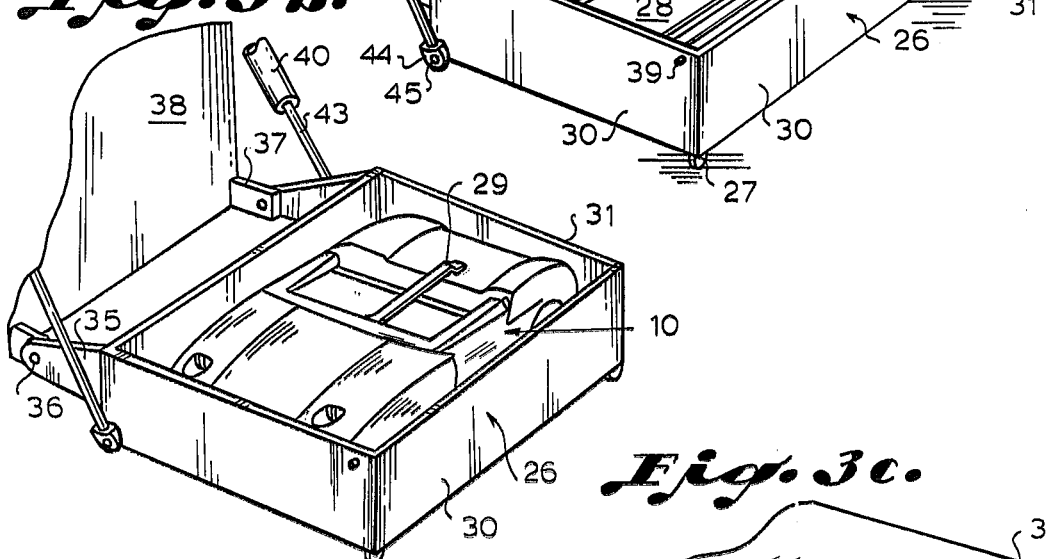
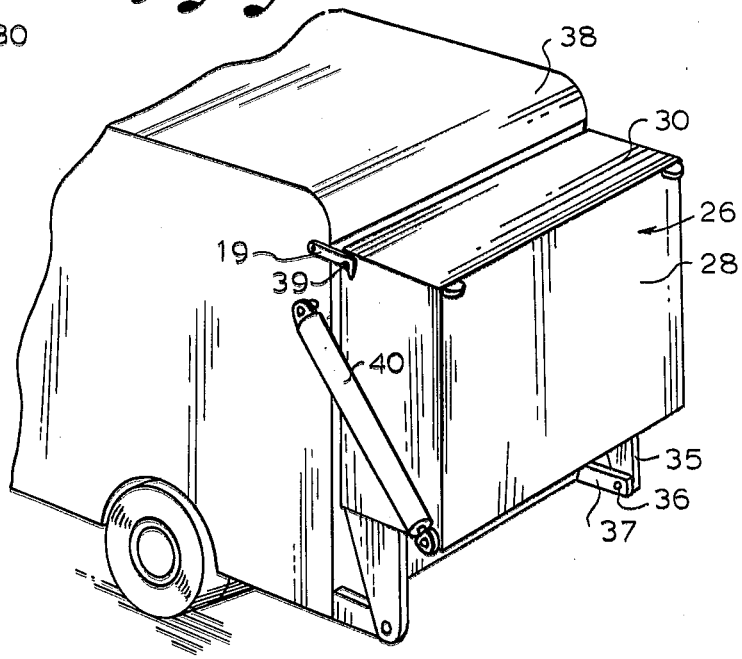

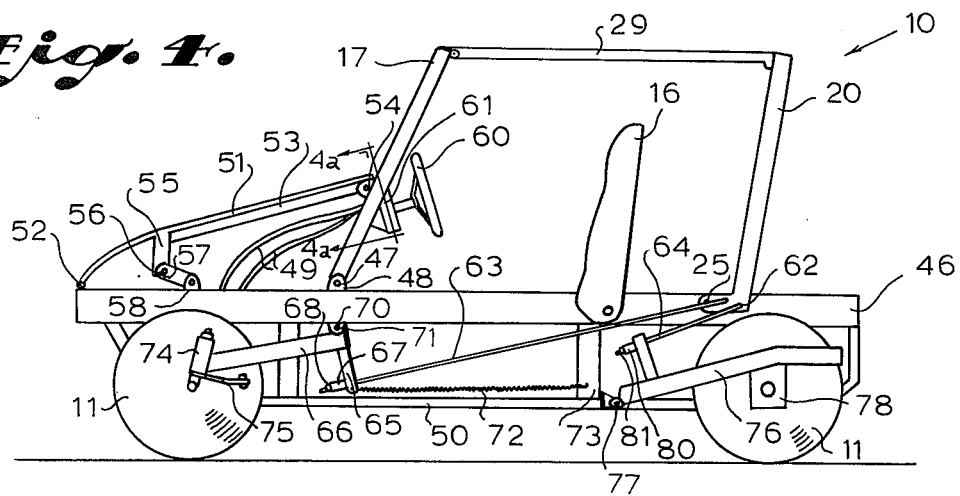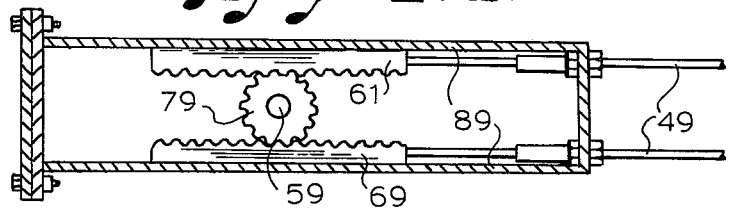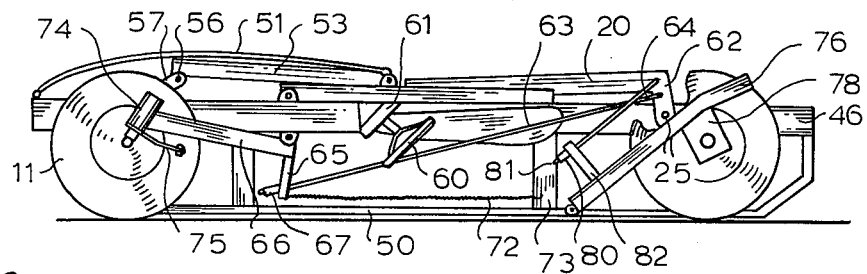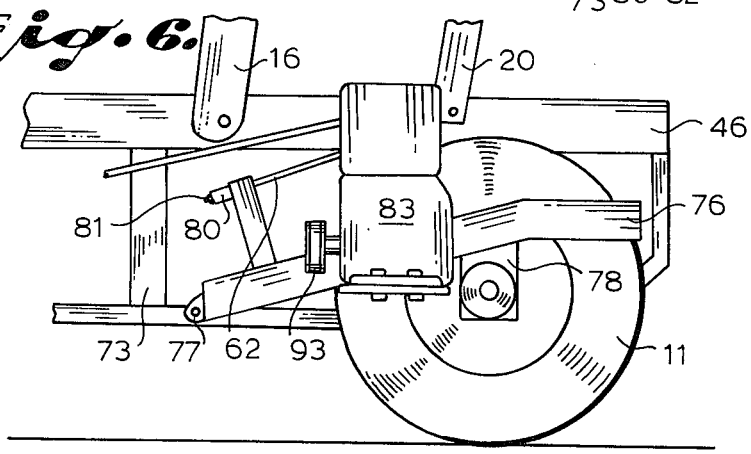

COLLAPSIBLE VEHICLE

BACKGROUND OF THE INVENTION

The present invention relates to a collapsible or foldable vehicle which can be transported in its own container on the back of a motor home, yacht, or the like, or which may be simply stored or shipped in a container.

In recent years there has been a great increase in the number of motor homes and campers on the highways, as well as yachts moving from place to place through the intracoastal waterway, lakes and oceans. These motor homes and yachts make temporary or permanent homes for the owners who can travel from city to city and state to state without living in motel rooms and driving small vehicles. Many of the motor homes and yachts have the same conveniences as a permanent home. One of the problems encountered by the occupants of motor homes is local transportation around the city once the motor home has reached its destination. The motor homes are generally too large for use around town and are expensive to use in this manner because of their large consumption of fuel. In addition, once the motor home is attached to electrical and gas hookups it must be unhooked and reconnected each time it is used for local errands. This problem is partly solved by the owners being able to rent cars in most cities, but rented cars are expensive and are generally not readily available at the motor home campsites. Many motor home owners attach bicycles or small motorbikes to the front or back of their motor homes for making short local trips when they reach their destination. In addition, motor homes sometimes carry a small boat on top or trailer a boat or small automobile.

The present invention advantageously overcomes many of the disadvantages in motor home travel by providing a small automobile which is collapsible into a compact shape, which can fit into its own container when collapsed, and which is easily transported on the back of a motor home. The vehicle can be rapidly removed from the motor home and opened for local transportation. In addition, the collapsible vehicle is ideally suited for transportation on yachts, trucks or for shipping between locations. In case of a yacht or even a motor home the container for the folded vehicle can be in the form of a small boat which can be utilized at campsites.

SUMMARY OF THE INVENTION

The present invention relates to a foldable vehicle which can be transported in its own container on the back of a motor home, yacht, or the like, and includes a chassis having a plurality of wheels attached thereto and a pair of foldable seats. The wheels may be raised relative to the chassis from an operative position to a collapsed position and may be locked in the operative position when the vehicle is being used. The vehicle has a foldable roll bar which forms a pair of levers which actuates the raising of the wheels through a toggle mechanism and which also incorporates the vehicle suspension therein. In addition, the hood, the steering column, steering wheel, and seats can be folded to complete the collapsing of the vehicle. A container for storing and transporting the collapsed vehicle may be attached to the back of a motor home, yacht, or the like, which container has one side which can be folded down for putting the vehicle into and out of the container and includes a lifting mechanism attached to a motor home and to the container to lift the container from ground level to a position adjacent the motor home. Latching brackets are provided for locking the folded vehicle in the container.

BRIEF DESCRIPTION OF THE DRAWINGS

Other objects, features and advantages of the present invention will be apparent from the written description and the drawings in which:

FIG. 3a is a perspective view of the container attached to the back of a motor home with the vehicle of FIGS. 1 and 2 being positioned therein;

FIG. 3b is a perspective view of a folded vehicle in the container;

FIG. 3c is a perspective view of the container having the folded vehicle herein positioned on the motor home for transportation and storage;

FIG. 4 is a side elevation view of the chassis of the vehicle with the folding components attached thereto in their erected position;

FIG. 4a is a sectional view of a steering mechanism;

FIG. 5 is a side elevation view of the embodiment of FIG. 4 in a collapsed position;

FIG. 6 is a cutaway side elevation of the chassis and folding component of FIGS. 4 and 5 but including the engine;

DESCRIPTION OF THE PREFERRED EMBODIMENT

Figure 1:
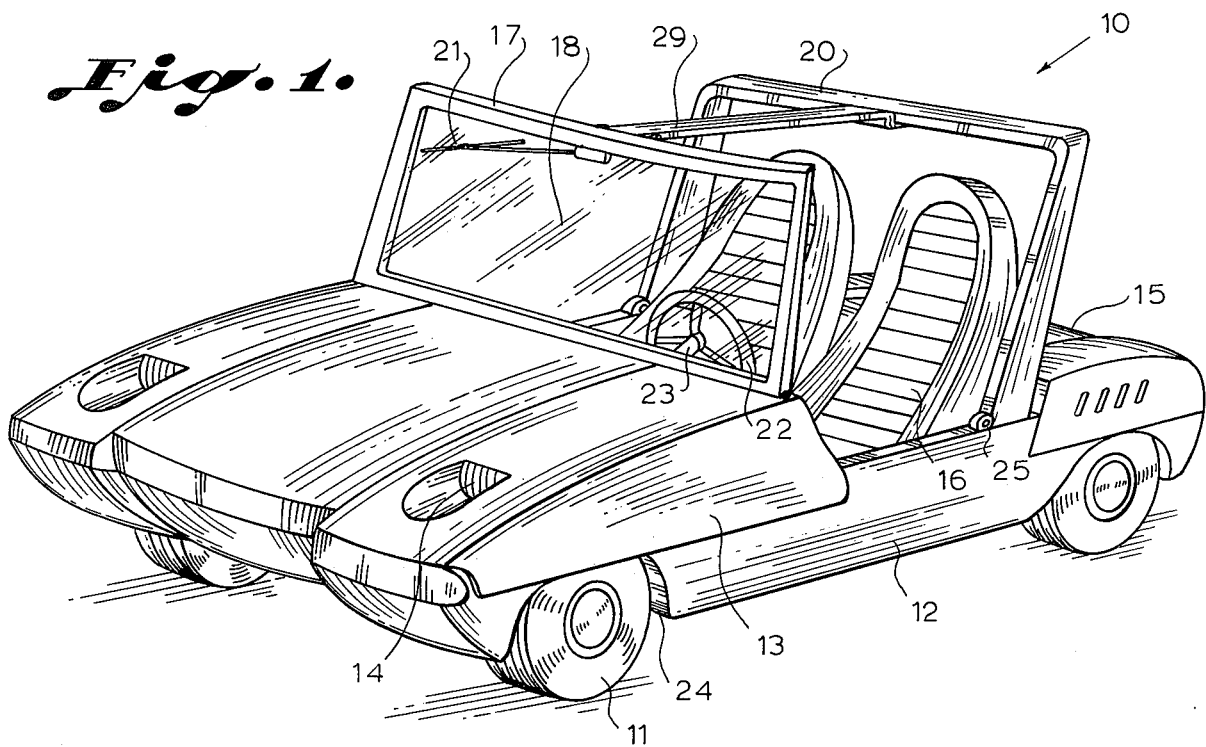
FIG. 1 is a perspective view of a vehicle in accordance with the present invention in its operative or unfolded position.
Figure 2:
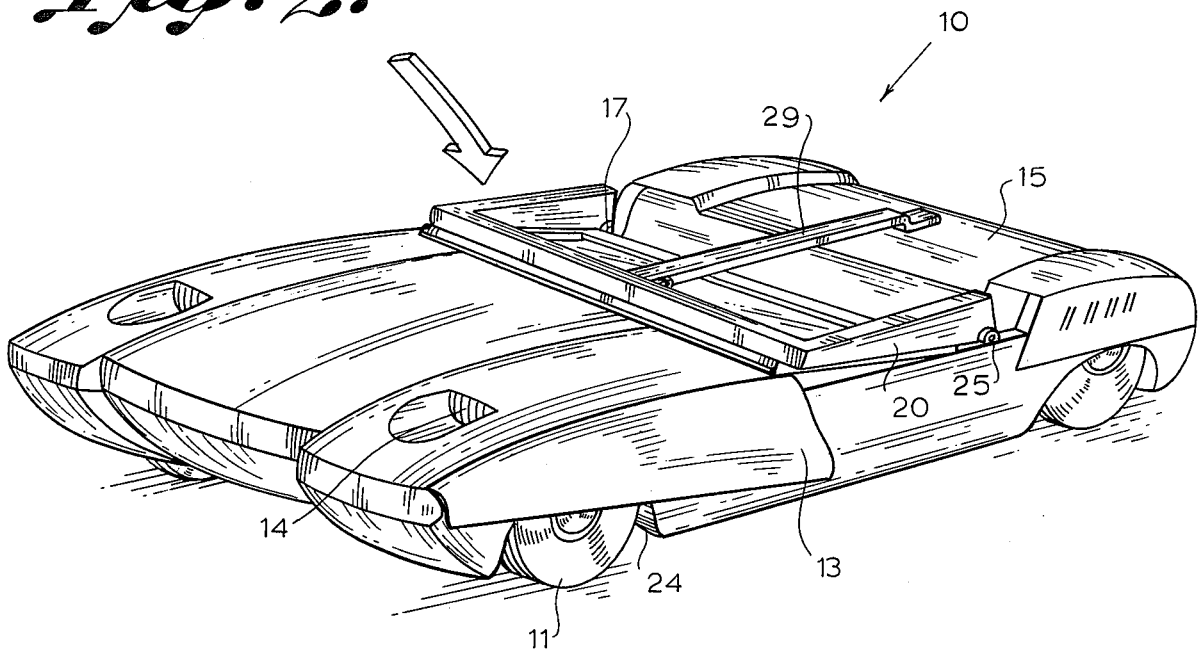
FIG. 2 is a perspective view of a vehicle in FIG. 1 in its folded or collapsed position.

Referring to FIGS. 1 and 2 of the drawings, a collapsible vehicle 10 is illustrated in FIG. 1 in its erected position while FIG. 2 has the same vehicle 10 in its collapsed position for storage, transportation, or shipping. The vehicle 10 has four wheels 11 having balloon tires thereon, and has a body 12 having a foldable hood 13 over the front portion thereof which has headlights 14 mounted therein. The body also includes an engine compartment cover 15 located behind a pair of bucket seats 16. A windshield frame 17 has safety window glass 18 mounted therein and a roll bar 20 is mounted to protect the occupants of the seats 16. The window 18 has a windshield wiper 21 and a steering wheel 22 mounted thereon.

In the folded position of FIG. 2, the backs of the seats 16 have been folded down and the windshield frame 17 and attached steering wheel 22 has been folded over the seats which thereby drops the hood 13. The roll bar 20 is folded forward on hinge pins 25 which pins rotatably attach the roll bar 20 to the chassis of the vehicle. The folding of the roll bar causes the wheels 11 to be raised relative to the vehicle body and chassis into the tire wells 24. The folding of the vehicle is rapidly accomplished from that illustrated in FIG. 1 to that illustrated in FIG. 2 so that a compact folded vehicle of FIG. 2 can fit into a storage or shipping container. The vehicle, as illustrated, is approximately 7 feet long, weights approximately 600 pounds and is 44 inches in height when erected and 18 inches high when collapsed. A hinged bar 29 is attached to the roll bar 20 by a hinge and is removably attached to the windshield frame 17 with a wingnut or the like. This provides additional support to the unfolded vehicle, while holding the windshield in place and is easily swung out of the way when folded.

Turning now to FIGS. 3a and 3c, the collapsing, storing and transporting of the vehicle of FIGS. 1 and 2 is illustrated. In FIG. 3a, the erected vehicle 10 is being pushed towards vehicle container 26 which container has four feet 27 attached to a bottom 28 and a plurality of sides 30. A hinged side 31 folds down as illustrated in FIG. 3a to allow the vehicle 10 to be rolled thereinto on its wheels 11. A plurality of wheel guides 32 positions the wheels 11 of the vehicle 10 in place in the container 26 and four hooks 33 are rotatably attached to brackets 34 attached to the floor 28 of the container 26. The hooks 33 are adapted for latching and locking into openings 99 (FIGS. 7 & 8) in the chassis or onto the front axle and rear frame of the vehicle 10 for holding the vehicle in the container 26. An alternative attachment for attaching the folded vehicle in container 26 is to bolt a bar across the container 26 over the folded vehicle. Thus, the vehicle 10 may be rolled into the storage container 26, then collapsed, as illustrated in FIGS. 2 and 3b, and locked with the hooks 33 to the container 26. Hinged side 31 may be lifted and latched to complete the positioning of the vehicle in the container. The container 26 has a pair of arms 35 held by pins 36 to support brackets 37 which are attached to a motor home 38 to allow the container 26 to be rotated on pins 36. A pair of hydraulic actuated cylinders 40 are attached to motor home 38 by brackets 41 with pins 42. Hydraulic cylinders 40 are shown open to more clearly illustrate the invention, but would normally be covered by container 26 or shrouds attached thereto to enhance its aesthetic appeal. The power rods 43 of the hydraulic cylinders 40 are attached with pins 44 to the brackets 45 which are rigidly attached to the corners of the container 26. Actuation of the hydraulic cylinders 40 will raise and lower the container 26 adjacent the motor home 38 as illustrated in FIG. 3c. Thus, the vehicle 10 is driven in the container in FIG. 3a, collapsed with side 31 closed in FIG. 3b, and raised onto the back of the motor home 38 as illustrated in FIG. 3c for storage and transportation. A pair of latch hooks 19 are attached to the motor home 38 and can catch onto latching studs 39 to provide safety locks. The cylinders 40 can also hold the container 26 in place and other locking devices can be used to secure the container 26 without departing from the scope of the invention. An interesting variation of the container 26 can be achieved by making the container 26 into a disconnectable container which can act as a small boat, or alternatively, the container can be designed for a small boat to fit over the collapsed vehicle 10 inside the container so that both may be carried on the back of a motor home for the use by the owner as he moves from town to town.

Turning now to FIGS. 4 through 8, which is a cutaway through the center of the car, the mechanism for collapsing the vehicle is more clearly illustrated with the body removed from the vehicle 10 which shows the chassis 46 having wheels 11 attached thereto along with the window frame 17 which is shown pinned by pin 47 to a bracket 48 which is attached to the chassis 46. The chassis 46 has the roll bar 20 rotatably attached thereto by pins 25. The seats 16 are attached to bottom frame members 50. Hood 13 (FIGS. 1 and 2) has a support framework 51 which is attached to the frame 46 through arm 57 and window frame 17 for collapsing to its closed position and bracing member 53 is movably connected by pin 54 to the window frame at one end and has a bracket 55 at its other end. Bracket 55 is connected by pin 56 to linkage arm 57 which in turn is pinned to a bracket 58. This allows hood 13 and support 53 to collapse when the window frame 17 is folded down and to be locked in its upright position when the window frame is erected. Hinged bar 29 is hinged to roll bar 20 and attached to the window frame 17 to hold the window frame in position, even though arm 57 can also be latched. The steering wheel labeled 22 in FIG. 1 is supported on steering wheel support box 61 which is fixedly attached to the window frame 17 and thereby folds with the window frame into the passenger compartment of the vehicle from the position shown in FIG. 4 to the position shown in FIG. 5. The motion of the steering wheel is transmitted to the arm 75 through a rack and pinion system in box 61 and flexible push-pull cables 49. At this point, it can be seen that the seats 16 can be folded forward and the window frame 17 folded thereover taking the steering wheel 60 with it and also collapsing the hood and hood supports 51 and 53.

FIG. 4a illustrates the steering mechanism located in steering box 61 having a steering column 59 passing thereto and attached to a pinion gear 79. Pinion gear 79 rotates gear racks 69 responsive to rotation of the steering column 59 allowing racks 69 to slide in tracks 89 moving flexible cables 49 to push-pull arm 75 and steer the vehicle. The rack and pinion box 61 is mounted to the window frame and the flexible cables 49 accommodate the folding action thereof. This arrangement also obviates the need for a collapsing or energy absorbing steering column.

The raising of the wheels 11 is accomplished by disconnecting the support for 29, and folding the roll bar 20 forward over the seats and windshield. Roll bar 20 has a horizontally extending portion 62 having a pair of front tie rods 63 and a pair of rear tie rods 64 attached at predetermined positions so that the rods 62 and 63 are pulled or pushed by folding or erecting the roll bar. A mechanical advantage is gained by the roll bar acting as a lever. The roll bar 20 is secured in its erected position by double acting safety catches on both sides but, as will be illustrated, the vehicle would not collapse even in the absence of such safety catches. Tie rod 63 is connected to a bell crank axle hanger 66 with arm 65 and has a plurality of resilient rubber spheres 67 having passageways therethrough slid over the end of the rod 63 and bolted with a nut and washer 68. These resilient members 67 act as a spring suspension for the vehicle in damping wheel and axle vibrations and exhibit a uniquely varying spring rate such that ride characteristics remain constant regardless of the load. This feature is important since the passenger load is a significant fraction of the total suspended mass. The rubber spheres will provide damping as a result of its hysteresis. The bell crank front axle hangers 66 are physically connected to the front axle which supports the wheels 11. Thus, when the wheels and axles are riding on a rough surface they are driven against the resilient rubber spheres 67 adjacent the arm 65 to provide both spring and shock absorber action for the front wheels. The front axle hangers 66 are mounted with a heavy pin 70 to a bracket 71 welded to the chassis 46. In addition, a counterbalancing spring 72 is connected at one end to the arm 65 and at the other end to a frame member 73. This eases the load required to raise and lower the wheel by the movement of roll bar 20. The front wheels include a steering linkage movably mounting the front wheels 11 to the axle to allow the front wheels to be steered in response to movement of the steering wheel 60 as illustrated in FIG. 4a. The wheels are mounted in bearings 74 having a steering arm 75 extended therefrom for each wheel with a steering tie rod connecting the arms 75 between the wheels. Similarly, the rear tie rod 64 is connected to a rear axle hanger 76 connected by heavy pins 77 to the lower chassis member 50 and supporting the rear wheels with hanger brackets 78. The rear suspension of the vehicle has a plurality of resilient rubber spheres 80 placed on the tie rod 64 and held by a nut and washer 81, like the front suspension, so that movement of the axle suspension member 76 by the movement of the rear wheels 11 will push the axle supporting members 76 against the rubber spheres 80 to act as spring and shock absorbers for the rear wheels. Collapsing and raising the wheels is accomplished by pushing the roll bar 20 forward, which by its lever action, releases the tie rods 63 and 64 thereby allowing the axle hanging members 76 and 66 to raise the front axle and front wheels relative to the chassis, as well as raising the rear wheels simultaneously. This mechanism for raising and lowering the wheels of the vehicle not only performs the simultaneous function of raising all four wheels, but incorporates the suspension system for the vehicle and includes counterbalancing for each of operation. This mechanism forms a toggle mechanism which will hold the wheels in the erected position even when the roll bar 20 is not latched even through the roll bar 20 will have double acting safety latches on each side of the roll bar 20. It will of course be clear that the operation of the mechanism is identical on both sides of the vehicle even though only one side has been illustrated.

Figure 7:
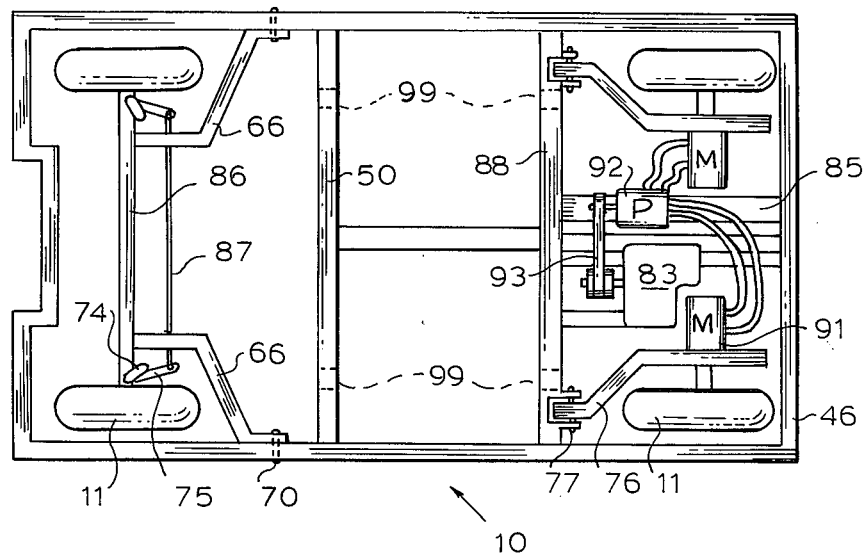
FIG. 7 is a top plan view of the chassis, wheels, engine, and drive system for the wheels.
Figure 8:
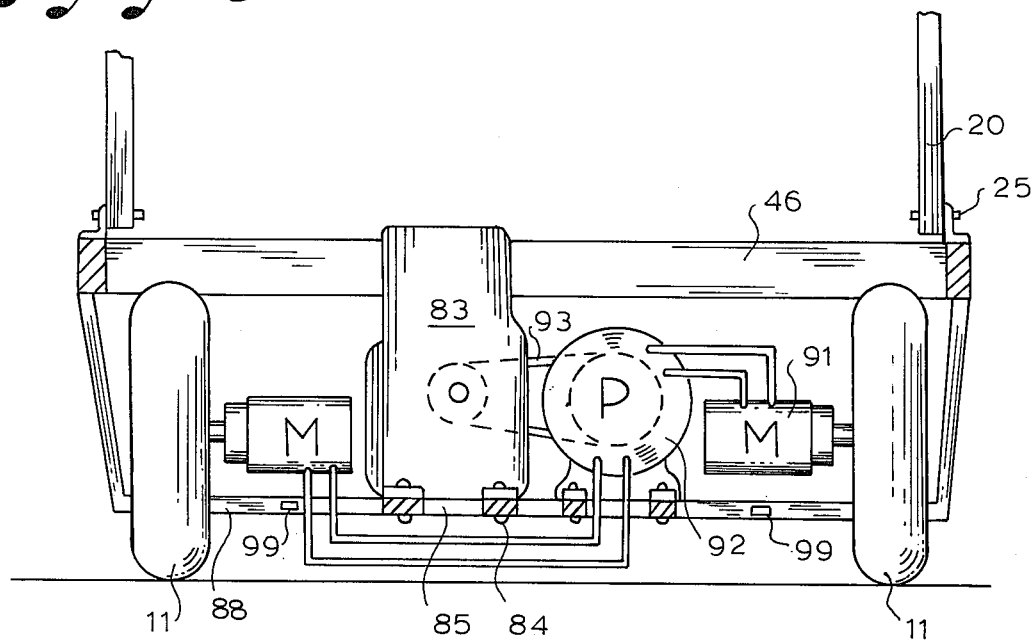
FIG. 8 is a rear elevation view of the chassis having the engine and transmission attached thereto.

In FIGS. 6, 7 and 8, the engine 83 is illustrated mounted with bolts 84 to frame members 85 on the rear of the vehicle. The vehicle 10 has the chassis 46 which can be made of channel iron surrounding the occupant's compartment to form a safety cage to protect the occupants of the vehicle. The chassis 46 has the front axle hangers 66 attached to the front axle 86 and being rotatably mounted to pins 70 supported on the chassis 46. The front wheels 11 are mounted in bearings 74 which have steering arms 75 attached thereto and are connected by tie rod 87 so that movement of the tie rod will move both front wheels simultaneously. The rear wheels 11 have hubs mounted directly to rear wheel hangers 76. Rear wheel hangers 76 are rotatably pinned with pins 77 to a cross bar 88 of the chassis 46. The rear wheels 11 are driven by hydraulic motors 91, each connected to a single or dual hydraulic pump with valving for transmission or an automatic hydrostatic transmission 92 which in turn is driven by a belt 93 in pulleys driven by engine 83. It will of course be clear that any type of engine desired can be utilized without departing from the spirit and scope of the invention, but in its present configuration a two-cylinder, two-cycle internal combustion engine with an electric starter can be utilized to operate the transmission 92 to drive the vehicle. Transmission 92 is a conventional hydrostatic transmission having a pump for controlling the motors 90 and 91 or a gear pump with valving to provide forward, neutral and reverse. The engine 83 and transmission 92 are each supported on frame member 85 by bolts 84.

It should be clear at this point, that a foldable or collapsible vehicle has been disclosed which can be rapidly folded by lowering the front seats then unlatching and folding the windshield which folds the hood and steering wheel, then folding the roll bar forward to raise the wheels to collapse the vehicle. It should also be clear that other embodiments are contemplated as being within the scope of the invention. For instance, different body designs can be utilized for the vehicle and different container shapes for storing and transporting the vehicle which can be transported on top of a second vehicle as well as on the back or the front as desired. Likewise, the wheels may be mounted from arms, as in FIGS. 4 through 8, but the arms may be pivoted in many different fashions so as to accomplish the same result. For example, an independent front suspension could be accomplished by splitting the front axle 86 in the center and providing a second pivot point near the front center of the chassis 46 such that the wheels 11 would move in an arc about the line connecting the new pivot and the present pivot pin 70 (which would be rotated to permit the discreet springing action). Furthermore, the wheels could be rotated about an axis lying in the horizontal plane and parallel to the length of the vehicle to provide a lower silhouette when folded. Likewise, a mechanical drive system using belts, chain, gears or the like could be used to propel the vehicle in place of the fluid transmission shown.

Accordingly, the present invention should not be construed as limited to the particular forms disclosed herein since these are to be regarded as illustrative rather than restrictive.

I claim:
1. A foldable vehicle comprising in combination:
   a chassis;
   a plurality of wheels, each mounted to one of a plurality of axles;
   at least one seat; a plurality of axle suspending members, each member having a bell crank pinned between its ends to said chassis and having one axle attached to at least one arm of one said bell crank;
   means for lowering said chassis relative to said wheels from an erected position to a folded position, said means including means for locking said wheels in an operative position for movably supporting said chassis; and at least one folding lever movably attached to said chassis and connected to a second arm of each of said plurality of bell cranks through a plurality of tie rods connecting said folding lever to each axle suspending member whereby movement of said lever will move said tie rod and axle suspending member to raise and lower said axle and wheels attached thereto relative to said chassis.

2. The apparatus in accordance with claim 1 in which said lever includes a safety latching mechanism for latching said lever in the erected position.

3. The apparatus in accordance with claim 2 in which said levers are formed into a roll bar for the vehicle.

4. The apparatus in accordance with claim 1 in which at least one axle suspending member has a counterbalancing spring attached thereto and to said chassis for counterbalancing the movement of said wheels relative to said chassis.

5. The apparatus in accordance with claim 4 in which a pair of levers are formed into said roll bar have two front tie rods attached thereto and two rear tie rods attached thereto for actuating four wheels simultaneously.

6. The apparatus in accordance with claim 5 in which each front wheel tie rod is connected to a bell crank arm rotatably attached to said chassis and each rear wheel tie rod is attached to a bell crank attached to said chassis for actuation of all four wheels simultaneously.

7. The apparatus in accordance with claim 6 in which said front wheel tie rods have resilient members attached thereto for providing spring action between said front wheel tie rods and said axle suspending members.

8. The apparatus in accordance with claim 7 in which each said rear tie rod has resilient members attached thereto for providing a resilient support to said rear wheels.

9. The apparatus in accordance with claim 8 in which said resilient members are rubber spheres having passageways therethrough for sliding onto said tie rods and locking members for locking said rubber spheres between the end of said tie rods and said front and rear bell cranks.

10. The apparatus in accordance with claim 6 in which said tie rods and bell cranks form a toggle mechanism for locking said wheels in an operating position.

11. The apparatus in accordance with claim 1 in which said chassis has a hood rotatably attached thereto whereby said hood may be lowered from erected porition to a folded position.

12. The apparatus in accordance with claim 11 in which a window frame is rotatably attached to said chassis and said window frame has an erected position and folded position and means for locking said window frame in its erected position.

13. The apparatus in accordance with claim 12 in which a support frame member is disconnectably attached between said roll bar and said window frame in their erected positions for locking said window frame in its erected position.

14. The apparatus in accordance with claim 12 in which said window frame has a steering box and steering wheel mounted thereto for steering said vehicle.

15. The apparatus in accordance with claim 14 in which said steering box has a rack and pinion gears therein operatively coupled to said steering wheel for movement thereby.

16. The apparatus in accordance with claim 15 in which flexible cables are attached from said rack and pinion gears in said steering box to a steering rod for steering said vehicle wheels responsive to movement of said steering wheel.

17. The apparatus in accordance with claim 12 in which said hood is connected to said window frame and collapses to its folded position in response to folding said window frame.

18. The apparatus in accordance with claim 17 in which said seats include folding means for folding the upright positions of said seats from a first erected position to a folded position.

19. The apparatus in accordance with claim 18 in which said roll bar is movable from an erected position to a folded position and simultaneously lowers said chassis over said wheels.

20. The apparatus in accordance with claim 19 in which said window frame has a steering wheel attached thereto and is foldable therewith.

* * * * *